United States Patent
Yin et al.

(10) Patent No.: US 10,366,084 B2
(45) Date of Patent: Jul. 30, 2019

(54) OPTIMIZING PIPELINING RESULT SETS WITH FAULT TOLERANCE IN DISTRIBUTED QUERY EXECUTION

(71) Applicant: Microsoft Technology Licensing, LLC, Redmond, WA (US)

(72) Inventors: Zhicheng Yin, Kirkland, WA (US); Jin Sun, Sammamish, WA (US); Ming Li, Issaquah, WA (US); Jaliya Nishantha Ekanayake, Redmond, WA (US); Yongchul Kwon, Kirkland, WA (US); José A. Blakeley, Redmond, WA (US); Marc T. Friedman, Seattle, WA (US); Haibo Lin, Issaquah, WA (US); Raghunath Ramakrishnan, Bellevue, WA (US); Tao Guan, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 308 days.

(21) Appl. No.: 15/267,115

(22) Filed: Sep. 15, 2016

(65) Prior Publication Data
US 2018/0075098 A1  Mar. 15, 2018

(51) Int. Cl.
*G06F 16/00* (2019.01)
*G06F 16/2453* (2019.01)
*G06F 16/2455* (2019.01)

(52) U.S. Cl.
CPC .. *G06F 16/24542* (2019.01); *G06F 16/24561* (2019.01)

(58) Field of Classification Search
CPC ......... G06F 17/30463; G06F 17/30501; G06F 16/24542; G06F 16/24561
See application file for complete search history.

(56) References Cited

U.S. PATENT DOCUMENTS

| 5,768,594 A | 6/1998 | Blelloch et al. |
| 7,693,847 B1 | 4/2010 | Brown et al. |

(Continued)

OTHER PUBLICATIONS

Zhang, et al., "Gang Scheduling Extensions for I/O Intensive Workloads", In Proceedings of the 9th Workshop on Job Scheduling Strategies for Parallel Processing, Jun. 24, 2003, pp. 1-14.

(Continued)

*Primary Examiner* — Alexander Khong
(74) *Attorney, Agent, or Firm* — Ray Quinney & Nebeker PC; Thomas M. Hardman; Timothy J. Churna

(57) ABSTRACT

Aspects extend to methods, systems, and computer program products for optimally pipelining result sets with fault tolerance in distributed query execution. Distributed computing jobs are optimized by dividing the distributed computing jobs into one or more bubbles for execution. Each bubble can be independently executed, potentially in parallel with other bubbles, when resources to handle the bubble are available. Intra-bubble communication can be streamed between vertices within a bubble. Inter-bubble communication can be stored to durable storage. Bubbles provide a failure boundary for a job graph and re-executing a bubble along with storage of intermediate results in durable storage can be used to recover from failures. When a vertex inside a bubble fails, computation can resume by rescheduling the execution of the failed bubble from the durable inputs for that bubble. Durable storage provides a light-weight failover to handle non-deterministic behavior. Jobs can also leverage streaming to increase performance.

20 Claims, 9 Drawing Sheets

(56) References Cited

U.S. PATENT DOCUMENTS

| | | | |
|---|---|---|---|
| 7,917,495 B1* | 3/2011 | Chapman | G06F 17/30445 |
| | | | 707/713 |
| 8,051,421 B2 | 11/2011 | Wylie et al. | |
| 8,701,112 B2 | 4/2014 | Borghetti et al. | |
| 8,732,720 B2 | 5/2014 | Verma et al. | |
| 9,141,430 B2 | 9/2015 | Cherkasova et al. | |
| 9,141,433 B2 | 9/2015 | Doyle et al. | |
| 9,218,209 B2* | 12/2015 | Waas | G06F 9/5027 |
| 9,286,044 B2 | 3/2016 | Boehm et al. | |
| 9,336,058 B2 | 5/2016 | Balmin et al. | |
| 9,361,154 B2 | 6/2016 | Booman et al. | |
| 2007/0067201 A1 | 3/2007 | Malewicz | |
| 2008/0201293 A1* | 8/2008 | Grosset | G06F 17/30592 |
| 2009/0254916 A1* | 10/2009 | Bose | G06F 9/5066 |
| | | | 718/104 |
| 2012/0066667 A1* | 3/2012 | Mascaro | G06F 9/5066 |
| | | | 717/127 |
| 2012/0284727 A1 | 11/2012 | Kodialam et al. | |
| 2013/0117305 A1* | 5/2013 | Varakin | G06F 9/5072 |
| | | | 707/769 |
| 2015/0112965 A1* | 4/2015 | Tokuda | G06F 17/30483 |
| | | | 707/718 |
| 2016/0006779 A1* | 1/2016 | Zhou | H04L 65/60 |
| | | | 709/231 |

OTHER PUBLICATIONS

Kramer, et al., "The Combining DAG: A Technique for Parallel Data Flow Analysis", In Journal of IEEE Transactions On Parallel and Distributed Systems, vol. 5, Issue 8, Aug. 1984, pp. 805-813.

U.S. Appl. No. 62/212,505, Guan, et al., "Tolarting Failures in Interactive Distributed Query Processing System", filed Aug. 31, 2015.

U.S. Appl. No. 62/233,992, Guan, et al., "Reduce overhead by pre-allocated/Long-Run services on MapReduce frameworks", filed Sep. 28, 2015.

U.S. Appl. No. 62/233,993, Guan, et al., "StreamNet as realtime communication channels for distributed big data compute system", filed Sep. 28, 2015.

* cited by examiner

Bubble 438 → Bubble 433
Bubble 433 → Bubble 432, Bubble 436, Bubble 437
Bubble 436 → Bubble 434
Bubble 432 → Bubble 431
FIG. 8
BubblePriority = MAX(DownStageBubblePriorities) + 100 — 900
FIG. 9
Bubble 438: 100
Bubbles 433 and 437: 200
Bubbles 432 and 436: 300
Bubbles 431 and 434: 400
FIG. 10

OPTIMIZING PIPELINING RESULT SETS WITH FAULT TOLERANCE IN DISTRIBUTED QUERY EXECUTION

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a collection of different computer systems and/or a collection of different computing environments. For example, distributed applications can have components placed across a collection of different computer systems.

When performing operations in a distributed environment, performance and fault-tolerance are counter balancing considerations. To improve performance, disk I/O is to be avoided as much as possible in favor of in-memory or over network communication between tasks. On the other hand, when intermediate results are stored into disk, the intermediate results can be used as a stable point from which to recover from failures.

In some frameworks, such as, Directed Acyclic Graph ("DAG") frameworks (e.g., map-reduce), a scheduler dispatches workload to nodes one by one. Each node reads input from disk and writes output to disk. The one-by-one approach is highly fault-tolerant, but has reduced performance.

In other frameworks, such as, U-SQL, a scheduler uses gang scheduling to schedule all vertices of a job graph at once. Each node streams data to a next node, for example, in memory and/or over a network. Gang scheduling has increased performance but is not fault-tolerant. If a vertex fails, the entire job graph also fails. Further, gang scheduling requires all resources needed to execute the job graph to be available. If a user has limited resources or there are insufficient resources available in the system to schedule the entire job graph, then gang scheduling fails to execute the job.

BRIEF SUMMARY

Examples extend to methods, systems, and computer program products for optimizing pipelining result sets with fault-tolerance in distributed query execution. Distributed computing jobs can be optimized by dividing the distributed computing job graphs into one or more sub-graphs (bubbles) for execution. Each bubble can be independently executed, potentially in parallel with other bubbles, when resources to handle the bubble are available. Intra-bubble communication can be streamed, via in-memory or network communication, between vertices within a bubble. Inter-bubble communication can be stored to durable storage.

Bubbles provide a failure boundary for a distributed computing job. Re-executing a bubble along with storage of intermediate results in durable storage can be used to recover from failures. Durable storage provides a lightweight failover in case of non-deterministic behavior. However, jobs can optionally leverage streaming between bubbles to increase performance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 8 illustrates an example dependency chain.

FIG. 9 illustrates an example equation for calculating bubble priority.

FIG. 10 illustrates an example of bubble priorities.

DETAILED DESCRIPTION

Figure 1:
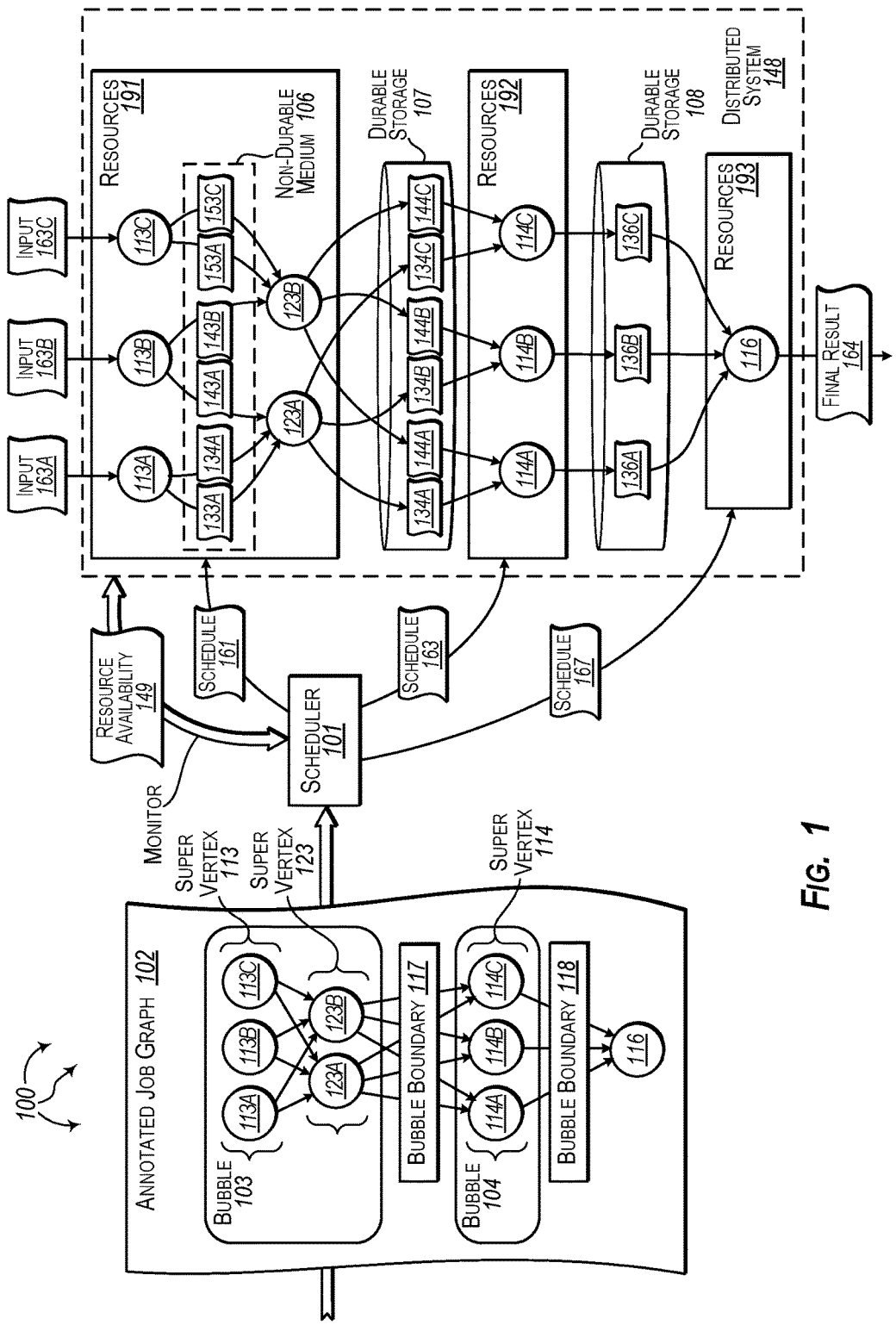
FIG. 1 illustrates an example computer architecture that facilitates pipelining result sets with fault tolerance in distributed query execution.

Examples extend to methods, systems, and computer program products for optimizing pipelining result sets with fault tolerance in distributed query execution.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), High-Bandwidth Memory (HBM), Non-Volatile RAM (NVRAM), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: a job graph, an annotated job graph, a query plan, an annotated query plan, a directed acyclic graph (DAG), an abstract syntax (AST), parallelism metrics, intermediate data size metrics, resources specifications, resource availabilities, bubbles, intermediate results, vertices, supervertices, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, a job graph, an annotated job graph, a query plan, an annotated query plan, a directed acyclic graph (DAG), an abstract syntax (AST), parallelism metrics, intermediate data size metrics, resources specifications, resource availabilities, bubbles, intermediate results, vertices, supervertices, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Thus, aspects of the invention including services, modules, components, etc. can comprise computer hardware, software, firmware, or any combination thereof to perform at least a portion of their functions. For example, a service, module, component, etc. may include computer code configured to be executed in one or more processors and/or in hardware logic/electrical circuitry controlled by the computer code.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Infrastructure as a Service ("IaaS"), Software as a Service ("SaaS"), and Platform as a Service ("PaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "distributed system" is defined as a system where components located on networked computers communicate and coordinate their actions by passing messages. The components interact with each other in order to achieve a common goal. Characteristics of distributed systems can include: concurrency of components, lack of a global clock, and independent failure of components.

In this description and the following claims, a "scale-out distributed system" is defined as a distributed system that scales horizontally by adding or removing resources from the distributed system.

In this description and the following claims, a "directed acyclic graph" (DAG) is defined as a directed graph with no directed cycles. A directed acyclic graph includes a plurality of vertices and one or more edges. Each edge is directed from one vertex to another vertex in a topological ordering such that each edge is directed from earlier to later in the ordering. For distributed computation, each vertex can represent a workload and each edge can represent results moving from one workload to another workload.

In this description and the following claims, a "supervertex" is defined as one or more vertices of the same vertex (e.g., workload) type operating in parallel.

In this description and the following claims, a "bubble" is a job sub-graph of a job graph which represents a scheduling/execution group of one or more workloads, wherein each of the one or more workloads is represented by one or more supervertices. Supervertices of a bubble are dispatched into nodes at essentially the same time. Within a bubble, nodes stream results to one another, for example, within memory and/or via network communication. Throughout the description and the following claims "bubble" and "job sub-graph" may be used interchangeably.

Given limited resources, performance and fault tolerance are two considerations of a distributed computation system. To improve performance, durable storage I/O is to be avoided as much as possible. On the other hand, storage of intermediate results in durable storage allows a computation to be restarted from the intermediate results if a node fails.

Aspects of the invention facilitate distributed computation systems that can achieve (or balance) both higher performance and fault tolerance. For distributed computations, such as, for example, executing a query plan, workloads can be reduced to a plurality of bubbles. Bubble boundaries can be determined based on supervertex resource requirements and/or supervertex dependencies. During execution, bubbles can be dispatched into nodes based on resource availability within a (e.g., scale-out) distributed system. Intra-bubble results can be streamed between supervertices within memory and/or via network communication. Inter-bubble results can be stored to and retrieved from durable storage. As such, when a vertex inside a bubble fails, computation can resume by rescheduling the execution of the failed bubble from the durable inputs for that bubble.

FIG. 1 illustrates an example computer architecture 100 that facilitates pipelining result sets with fault tolerance in distributed query execution. Referring to FIG. 1, computer architecture 100 includes scheduler 101. Scheduler 101 can be connected to (or be part of) a network, such as, for example, a Local Area Network ("LAN"), a Wide Area Network ("WAN"), and even the Internet. Accordingly, scheduler 101 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, scheduler 101 can receive a job graph for a distributed computation. The job graph can include a plurality of supervertices along with annotations for bubbles and bubble boundaries. The job scheduler can schedule the plurality of supervertices contained in the job graph and materialize intermediate results from the supervertices in accordance with the annotations to perform the distributed computation.

Scheduler 101 can be in communication with an optimizer (e.g., annotation/optimization module 301) and/or job graph generator. The optimizer and/or job graph generator can annotate job graphs to indicate bubbles and bubble boundaries in a cost-based manner. The optimizer and/or job graph generator can determine bubble boundaries considering parallelism (resource consumption by supervertices), dependencies between supervertices, and intermediate data size (e.g., to avoid large materialization). Bubble boundaries indicate when data is to be materialized to durable storage. As such, bubble boundaries facilitate fault tolerance and release resource pressure.

Figure 2:
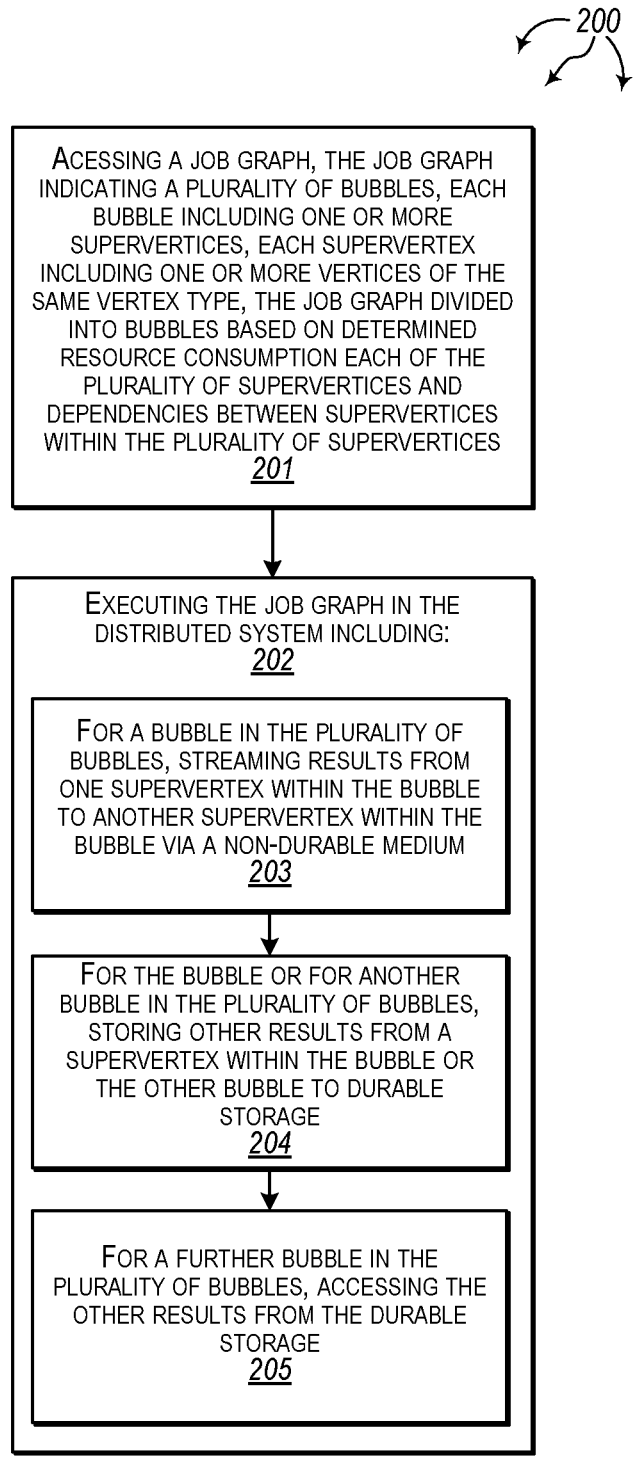
FIG. 2 illustrates a flow chart of an example method for pipelining result sets with fault tolerance in distributed query execution.

FIG. 2 illustrates a flow chart of an example method 200 for pipelining result sets with fault tolerance in distributed query execution. Method 200 will be described with respect to the components and data of computer architecture 100.

Method 200 includes accessing a job graph, the job graph indicating a plurality of bubbles, each bubble including one or more supervertices, each supervertex including one or more vertices of the same vertex type, the job graph divided into bubbles based on determined resource consumption each of the plurality of supervertices and dependencies between supervertices within the plurality of supervertices (201). For example, scheduler 101 can access annotated job graph 102. Annotated graph 102 indicates bubbles 103 and 104. Bubble 103 includes supervertices 113 and 123. Bubble 104 includes supervertex 114. Supervertex 113 includes vertices 113A, 113B, 113C of the same vertex type. Supervertex 123 includes vertices 123A and 123B of the same vertex type. Supervertex 114 includes vertices 114A, 114B, and 114C of the same vertex type.

An optimizer and/or job graph generator can determine bubble boundaries 117 and 118 and divide supervertices 113, 123, and 114 into bubbles 103 and 104 based on determined resource consumption for supervertices 113, 123, and 114 and dependencies between any of supervertices 113, 123, and 114. Bubble boundaries 117 and 118 indicate when intermediate results are to be materialized to durable storage.

Each of supervertices 113, 123, and 114 can be configured to perform one or more of a variety operations including but not limited to: extracting data, transforming data, filtering data, joining data, sorting data, aggregating data, merging data, grouping data, accessing data, storing data, identifying maximum values, partition data, extract data, shuffling data, broadcasting data, identifying minimum values, performing mathematical operations on data, storing data to durable storage, accessing data from durable storage, streaming data to another supervertex, etc.

Method 200 includes executing the job graph in a distributed system (202). For example, scheduler 101 can execute annotated job graph 102 using resources of (e.g., scale out) distributed system 148 including non-durable medium 106 (e.g., memory and/or network resources), durable storage 107 (e.g., a magnetic disk, solid state drive, or other storage device), and durable storage 109 (e.g., a magnetic disk, solid state drive, or other storage device).

Scheduler 101 can monitor resource availability 149 of distributed system 148 on an ongoing basis. Resources of distributed system 148 can be used to perform other processing tasks. As such, not all of the resources of distributed system 148 are available for executing annotated job graph 102. Further, available resources of distributed system 148 can fluctuate over time as other processing tasks use and release resources, machines go down, machines come online, etc.

Scheduler 101 can schedule supervertices of a bubble for execution when inputs for the supervertices are ready and when resource availability 149 indicates that sufficient resources (e.g., processor and memory resources) are available to handle all the supervertices of the bubble. Waiting until resources are available for all supervertices of a bubble before scheduling the bubble mitigates possible resource deadlock and resource starvation difficulties.

When a bubble contains a plurality of supervertices, scheduler 101 can schedule the plurality of supervertices when input for an earliest supervertex is available. For example, scheduler 101 can schedule 161 supervertices 113 and 123 for execution using resources 191 when inputs 163A, 163B, and 163C (e.g., a set of initial inputs) are available. From resource availability 149, scheduler 101 can determine that resources 191 are sufficient to process supervertices 113 and 123.

Method 200 includes for a bubble in the plurality of bubbles, streaming results from one supervertex within the bubble to another supervertex within the bubble via one of: memory or a network connection (203). For example, for bubble 103, results can be streamed from supervertex 113 to supervertex 123. Since processing is distributed, each vertex in supervertex 113 can have results for each vertex in supervertex 123. For example, vertex 113A can stream results 133A and 133B to vertices 123A and 123B respectively over non-durable medium 106. Similarly, vertex 113B can stream results 143A and 143B to vertices 123A and 123B respectively over non-durable medium 106. Likewise, vertex 113C can stream results 153A and 153B to vertices 123A and 123B respectively over non-durable medium 106. Non-durable medium 106 can include memory and/or network resources of distributed system 148.

Method 200 includes for the bubble or for another bubble in the plurality of bubbles, storing other results from a supervertex within the bubble or the other bubble to durable storage (204). For example, each vertices 123A and 123B can have results for each of vertices 114A, 114B, and 114C. Vertex 123A can store results 134A, 134B, and 134C in durable storage 107 for vertices 114A, 114B, and 114C respectively. Similarly, vertex 123B can store results 144A, 144B, and 144C in durable storage 107 for vertices 114A, 114B, and 114C respectively. Durable storage 107 can be a magnetic disk, solid state disk or other storage device of distributed system 148.

Scheduler 101 can schedule 163 supervertex 114 for execution using resources 192 when results 134A, 134B, 134C, 144A, 144B, and 144C are available. From resource availability 149, scheduler 101 can determine that resources 192 are sufficient to process supervertex 114.

Method 200 includes for a further bubble in the plurality of bubbles, accessing the other results from the durable storage (205). For example, supervertex 114 can access results from durable storage 107. More specifically, vertex 114A can access results 134A and 144A, vertex 114B can access results 134B and 144B, and vertex 114C can access results 134C and 144C. Vertices 114A, 114B, and 114C can stores results 136A, 136B, and 136C respectively at durable storage 108. Durable storage 108 can be a magnetic disk, solid state disk or other storage device of distributed system 148.

If any of vertices 114A, 114B, or 114C were to fail, computation can resume by re-scheduling bubble 104 again using the results stored in durable storage 107. In response to re-scheduling, vertex 114A can again access results 134A and 144A, vertex 114B can again access results 134B and 144B, and vertex 114C can again access results 134C and 144C. If vertices 114A, 114B, and 114C are successful after the re-schedule, results 136A, 136B, and 136C respectively can be stored at durable storage 108.

Scheduler 101 can schedule 164 vertex 116 for execution using resources 193 when results 136A, 136B, and 136C are available. From resource availability 149, scheduler 101 can determine that resources 193 are sufficient to process vertex 116. Vertex 116 accesses results 136A, 136B, and 136C from durable storage. Vertex 116 can combine results 136A, 136B, and 136C into final result 164.

Figure 3:
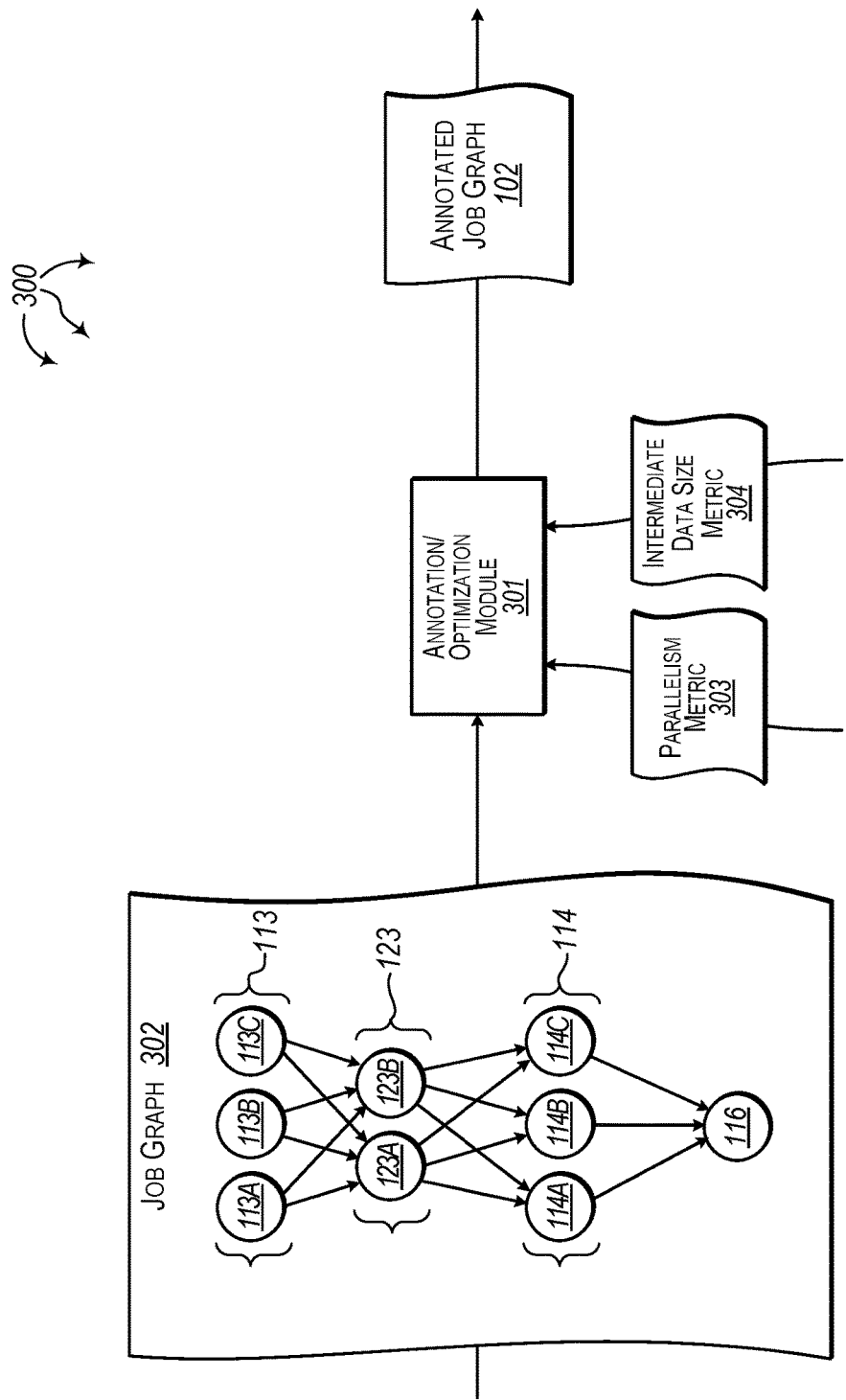
FIG. 3 illustrates an example computer architecture that facilitates annotating a job graph for a distributed computation.

Turning to FIG. 3, FIG. 3 illustrates an example computer architecture 300 that facilitates annotating a job graph for a distributed computation. Referring to FIG. 3, computer architecture 300 includes annotation module 301. Annotation module 301 can be connected to (or be part of) a network, such as, for example, a Local Area Network ("LAN"), a Wide Area Network ("WAN"), and even the Internet. Accordingly, annotation module 301 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, annotation module 301 can annotate job graph 302 based on parallelism metric 303 and intermediate data size metric 304 to form annotated job graph 102. Parallelism metric 303 can define a maximum resource consumption per bubble. Intermediate data size metric 340 can define a maximum intermediate data size per bubble.

In one aspect, annotation module 301 determines how to annotate job graph 302 in a plurality of stages. In one stage, annotation module 301 attempts to maximize the number of supervertices within each bubble in view of parallelism metric 303. Each supervertex is initialized as a bubble.

Based on operations within a supervertex, each supervertex has a specified resource consumption.

For each bubble, each successor and predecessor bubble are checked to determine the total resource consumption for supervertices in the bubble and supervertices in the successor or predecessor bubble. If total resource consumption is less than the maximum resource consumption per bubble, it is possible for bubbles to be merged. On the other hand, if total resource consumption exceeds the maximum resource consumption per bubble, bubbles are not merged. The process can continue iteratively to identify other bubbles for possible merging.

For example, annotation module 301 can initiate supervertices 113, 123, and 114 as separate bubbles. Annotation module 301 can determine that the total resource consumption for supervertices 113 and 123 is less than the maximum resource consumption per bubble. As such, annotation module 301 determines that it is possible for supervertices 113 and 123 to be merged into the same bubble. On the other hand, annotation module 301 can determine that total resource consumption for supervertices 113, 123, and 114 exceeds the maximum resource consumption per bubble. As such, annotation module 301 determines that supervertex 114 cannot be merged into the same bubble with supervertices 113 and 123.

In another stage, annotation module 301 attempts to minimize intermediate data size. Annotation module 301 considers intermediate data ordered by data size (e.g., in descendant order). Annotation module 301 determines the collective intermediate data size for supervertices that may be merged into the same bubble. If the collective intermediate data size is less than the maximum intermediate data size, the supervertices can be merged into the same bubble. If the collective intermediate data size exceeds the maximum intermediate data size, the supervertices cannot be merged into the same bubble.

For example, annotation module 301 can consider intermediate data from supervertices 113, 123, and 114. Annotation module 301 can determine that intermediate data from supervertices 113 and 123 is less than the maximum intermediate data size. As such, annotation module 301 determines that it is possible for supervertices 113 and 123 to be merged into the same bubble.

Accordingly, annotation module 301 annotates job graph 302 to formulate annotated job graph 102. The annotations indicate that supervertices 113 and 123 are in bubble 103 and that supervertex 114 is in bubble 104. The annotations also indicate bubble boundaries 117 and 118. Scheduler 101 can use the annotations to execute annotated job graph 102 as depicted in FIG. 1.

Figure 4A:
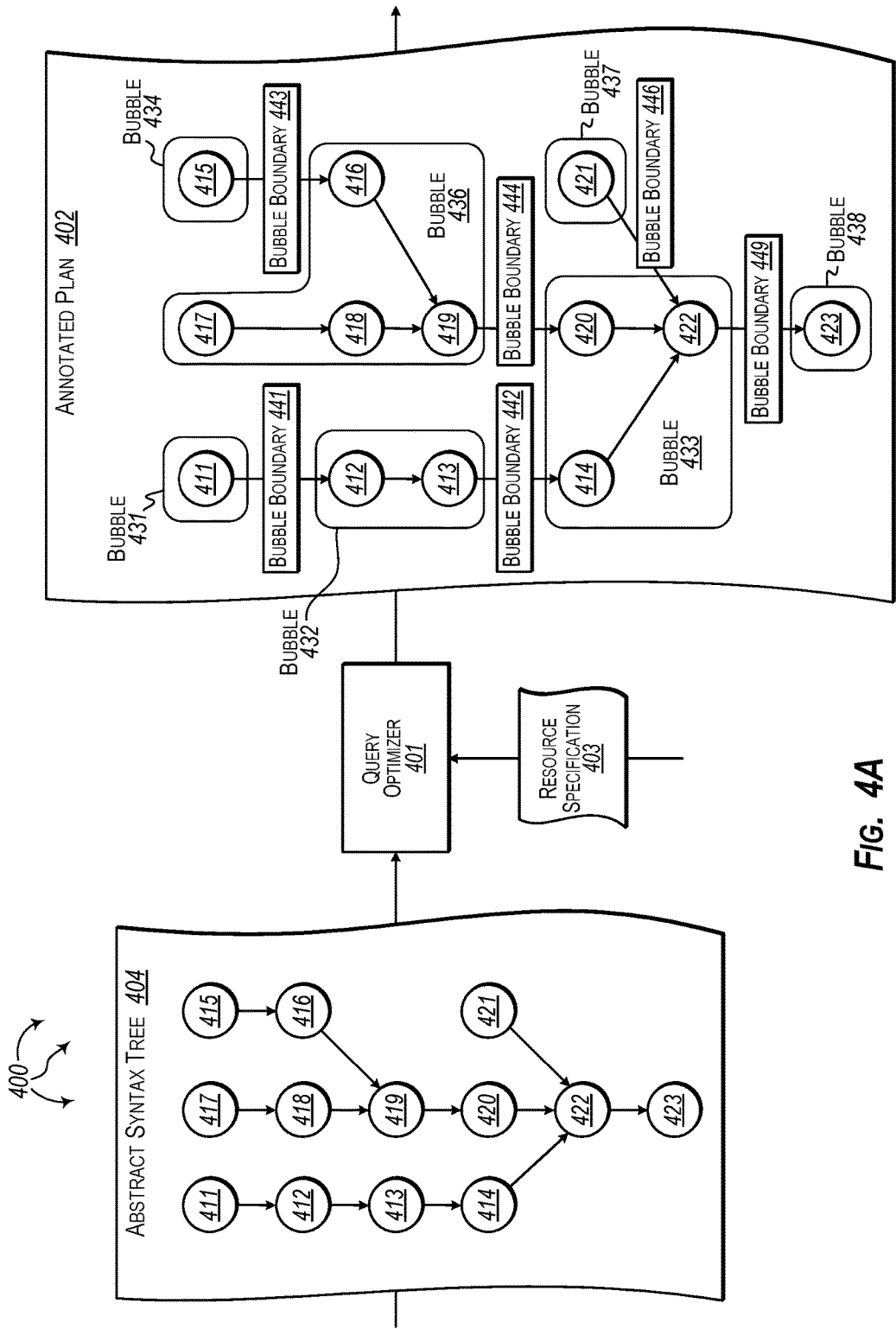
FIG. 4A illustrates an example computer architecture that facilitates annotating a query plan for execution in a distributed system.

Other aspects of the invention are more specifically used for optimizing query execution in a manner that balances performance and fault tolerance. FIG. 4A illustrates an example computer architecture 400 that facilitates annotating a query plan for execution in a distributed system. FIG. 4A also illustrates that the decision about determining bubble boundaries is a cost-based query optimization decision.

Referring to FIG. 4A, computer architecture 400 includes query optimizer 401. Query optimizer 401 can be connected to (or be part of) a network, such as, for example, a Local Area Network ("LAN"), a Wide Area Network ("WAN"), and even the Internet. Accordingly, query optimizer as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, query optimizer 401 can optimize a query plan (e.g., from a query compiler) for implementing the logical intent of a query in a (e.g., scale-out) distributed system. The query plan can include a plurality of supervertices representing a corresponding plurality of workloads to be performed to implement the query. Based on resource specification 403 (e.g., for the distributed system), query optimizer 401 can annotate the query plan to form an annotated query plan 402. Resource specification 403 can include parallelism metrics and/or intermediate size metrics.

In one aspect, query optimizer 401 determines how to annotate a query plan in a plurality of stages. In one stage, query optimizer 401 attempts to maximize the number of supervertices within each bubble in view of a parallelism metric. Each supervertex is initialized as a bubble. Based on operations within a supervertex, each supervertex has a specified resource consumption.

For each bubble, each successor and predecessor bubble are checked to determine the total resource consumption for supervertices in the bubble and supervertices in the successor or predecessor bubble. If total resource consumption is less than a maximum resource consumption per bubble, it is possible for bubbles to be merged. On the other hand, if total resource consumption exceeds the maximum resource consumption per bubble, bubbles are not merged. The process can continue iteratively to identify other bubbles for possible merging.

In another stage, query optimizer 401 attempts to minimize intermediate data size. Query optimizer 401 considers intermediate data ordered by data size (e.g., in descendant order). Query optimizer 401 determines the collective intermediate data size for supervertices that may be merged into the same bubble. If the collective intermediate data size is less than a maximum intermediate data size, the supervertices can be merged into the same bubble. If the collective intermediate data size exceeds the maximum intermediate data size, the supervertices cannot be merged into the same bubble.

Figure 4B:
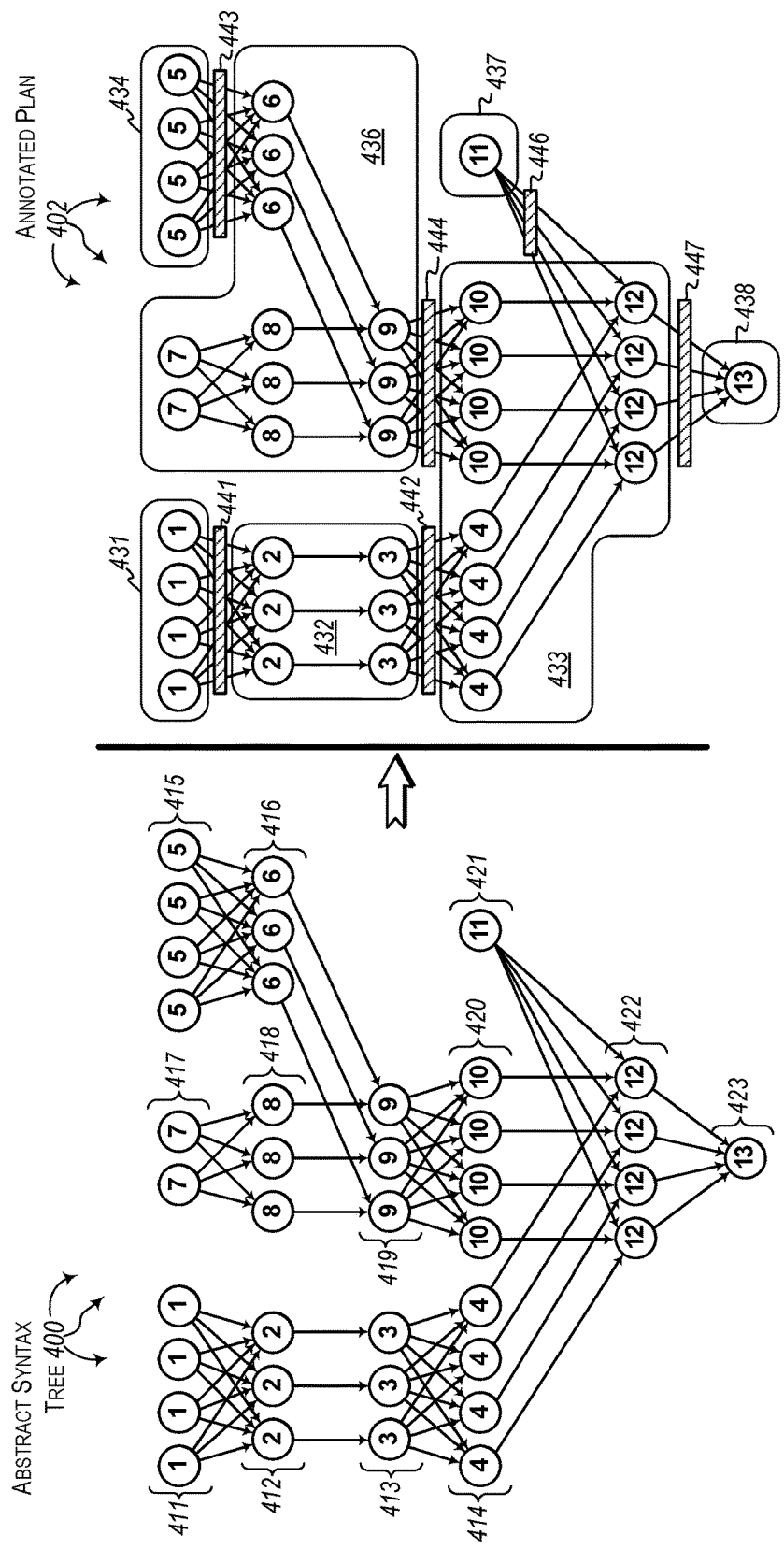
FIG. 4B illustrates a more detailed view of the abstract syntax tree and annotated query plan from FIG. 4A

For clarity, the one or more vertices of each supervertex in abstract syntax tree 404 and annotated plan 402 is abstracted out in FIG. 4A. FIG. 4B illustrates a more detailed view of the abstract syntax tree 404 and annotated query plan 402 from FIG. 4A.

Figure 5:
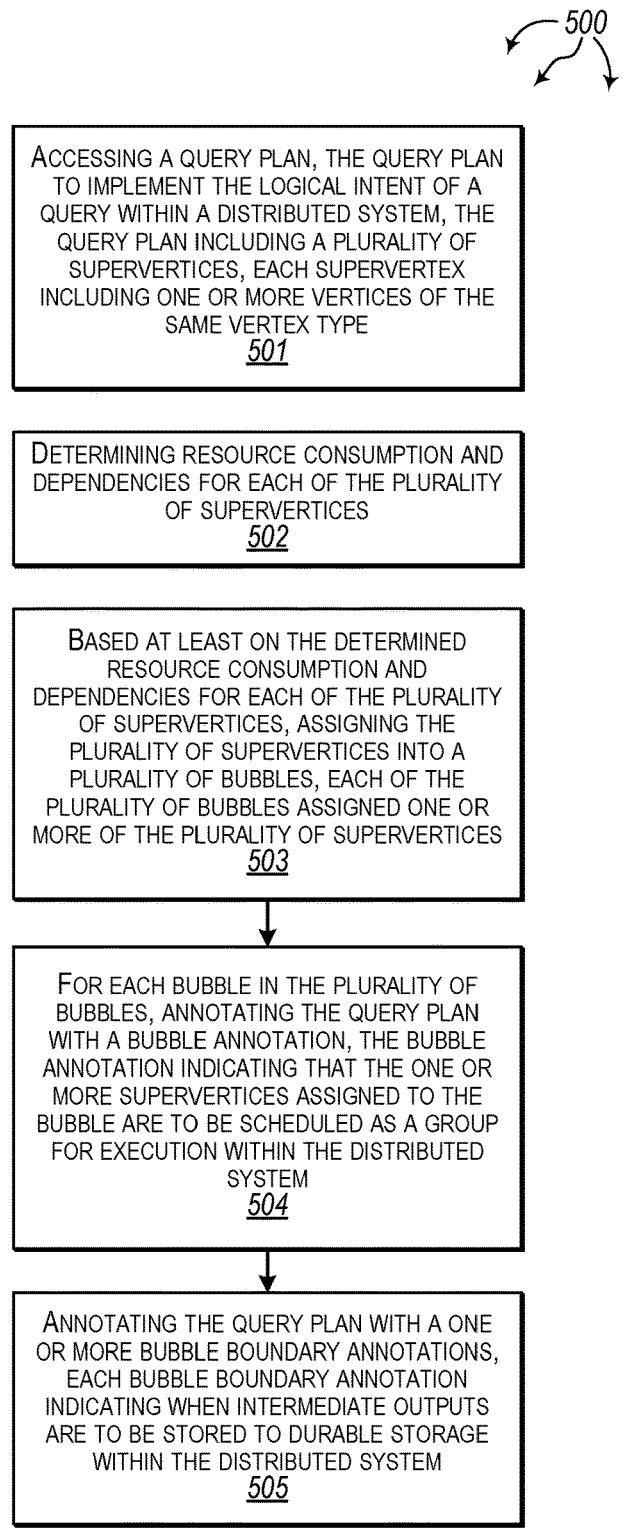
FIG. 5 illustrates a flow chart of an example method for annotating a query plan for execution in a distributed system.

FIG. 5 illustrates a flow chart of an example method 500 for annotating a query plan for execution in a distributed system. Method 500 will be described with respect to the components and data of computer architecture 400.

Method 500 includes accessing a query plan, the query plan to implement the logical intent of a query within a distributed system, the query plan including a plurality of supervertices, each supervertex including one or more vertices of the same vertex type (501). For example, query optimizer 401 can access abstract syntax tree 404. Abstract syntax tree 404 can be output from a query compiler. As depicted, abstract syntax tree 404 includes supervertices 411-423. Each of supervertices 411-423 can include one or more vertices of the same vertex type.

Each of supervertices 411-423 can be configured to perform one or more of a variety operations including but not limited to: extracting data, transforming data, filtering data, joining data, sorting data, merging data, aggregating data, grouping data, partition data, extract data, shuffling data, broadcasting data, accessing data, storing data, identifying maximum values, identifying minimum values, performing mathematical operations on data, storing data to durable storage, accessing data from durable storage, streaming data to another supervertex, etc.

Method 500 includes determining resource consumption and dependencies for each of the plurality of supervertices (502). For example, query optimizer 401 can determine resource consumption and dependencies for each of supervertices 411-423. Resource consumption for each supervertex can include memory and or processor resources for executing the supervertex as well as the size of any intermediate results.

Based at least on the determined resource consumption and dependencies for each of the plurality of supervertices, assigning the plurality of supervertices into a plurality of bubbles, each of the plurality of bubbles assigned one or more of the plurality of supervertices (503). For example, query optimizer 401 can compare resource consumption and dependencies to metrics in resource specification 403. Based on the comparisons, query optimizer can assign supervertices 411-423 into a plurality of bubbles. For example, query optimizer 401 can assign supervertex 411 to bubble 431, can assign supervertices 412 and 413 to bubble 432, can assign supervertices 414, 420, and 422 to bubble 433, can assign supervertex 415 to bubble 434, can assign supervertices 416, 417, 418, and 418 to bubble 436, can assign supervertex 421 to bubble 437, and can assign supervertex 423 to bubble 438.

For each bubble in the plurality of bubbles, method 500 includes annotating the query plan with a bubble annotation, the bubble annotation indicating that the one or more supervertices assigned to the bubble are to be scheduled as a group for execution within the distributed system (504). For example, for each of bubbles 431, 432, 433, 434, 436, 437, and 438. query optimizer 401 can annotate annotated plan 402. Each annotation can indicate that the one or more supervertices assigned to the bubble are to be scheduled as a group for execution within the distributed system. Annotations for bubbles 431, 434, 437, and 438 can indicate that supervertices 411, 415, 421, and 423 respectively are to be executed individually. An annotation for bubble 432 can indicate that supervertices 412 and 413 are to be executed as a group. Similarly, an annotation for bubble 433 can indicate that supervertices 414, 420, and 422 are to be executed as a group. Likewise, an annotation for bubble 436 can indicate that supervertices 416, 417, 418, and 419 are to be executed as a group.

Method 500 also includes annotating the query plan with a one or more bubble boundary annotations, each bubble boundary annotation indicating when intermediate outputs are to be stored to durable storage within the distributed system (505). For example, query optimizer 401 can annotate annotated plan 402 to indicate bubble boundaries 441, 442, 443, 444, 446, and 447. Annotations for each of bubble boundaries 441, 442, 443, 444, 446, and 447 indicate when intermediate results are to be materialized to durable storage within a distributed system. For example, an annotation for bubble boundary 441 indicates that intermediate results from supervertex 411 are to be materialized to durable storage. Similarly, an annotation for bubble boundary 444 indicates that intermediate results from supervertex 419 are to be materialized to durable storage.

Referring now to FIG. 4B, different supervertices include different numbers of vertices. Supervertex 411 includes four vertices of the type '1'. Supervertex 412 includes three vertices of the type '2'. Supervertex 417 includes two vertices of the type '7'. Supervertex 421 includes one vertex of type '11'. Other supervertices also contain between 1-4 vertices of the indicated types. However, an arbitrary number (and more than four vertices) may be included in a supervertex. Supervertex 423 includes one vertex of type '13'. Vertex type 13 can assemble final results from execution of annotated query plan 402.

Figure 6:
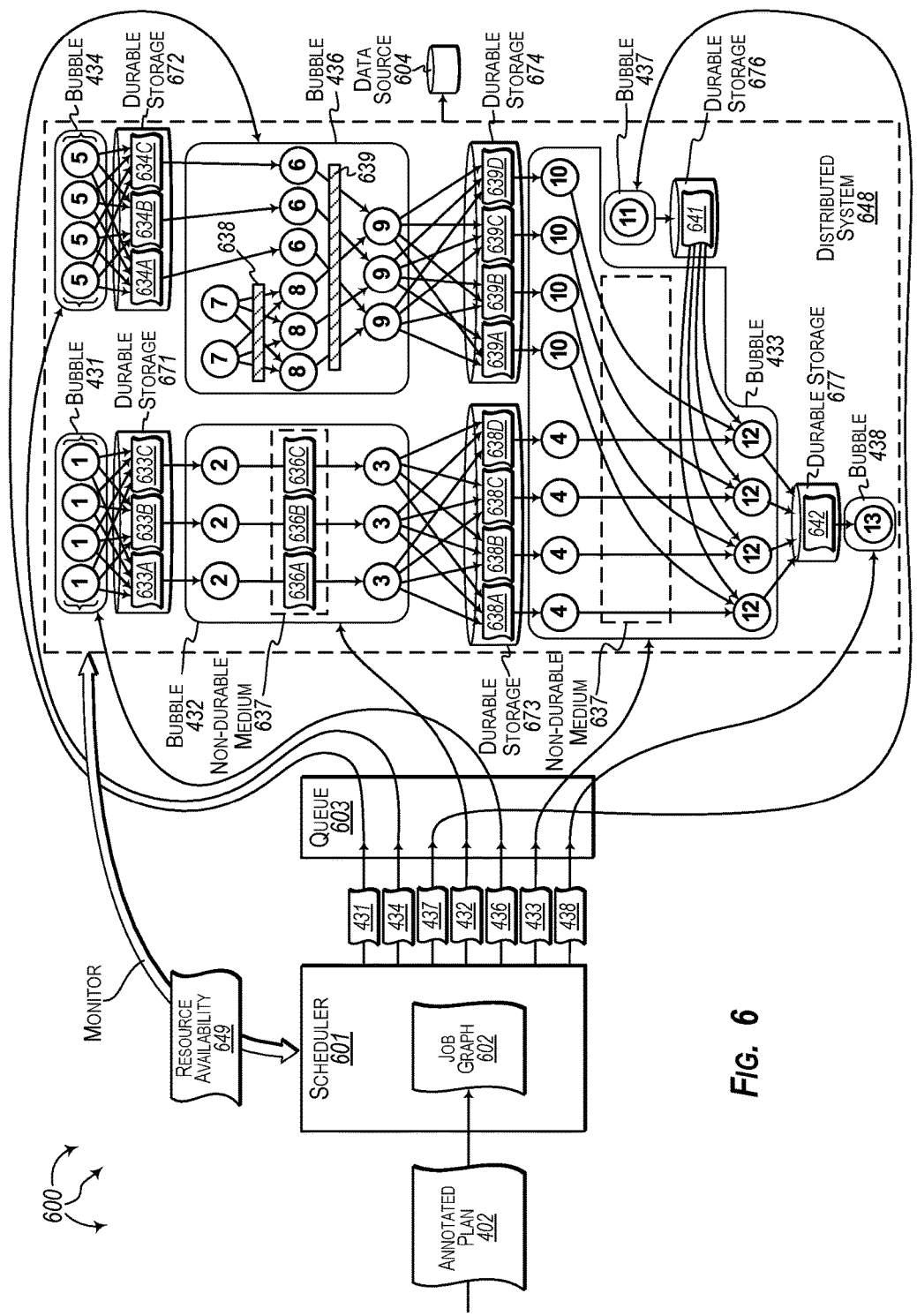
FIG. 6 illustrates an example computer architecture that facilitates executing an annotated query plan in a distributed system.

Turning to FIG. 6, FIG. 6 illustrates an example computer architecture 600 that facilitates executing an annotated query plan in a distributed system. Computer architecture 600 can be used to pipeline result sets with fault-tolerance in distributed query execution. Referring to FIG. 6, computer architecture 600 includes scheduler 601. Scheduler 601 can be connected to (or be part of) a network, such as, for example, a Local Area Network ("LAN"), a Wide Area Network ("WAN"), and even the Internet. Accordingly, scheduler 601 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, scheduler 601 can receive an annotated job plan, generate a Directed Acyclic Graph ("DAG"), and partition the DAG into bubbles (job sub-graphs). Scheduler 601 then dispatches bubbles for execution according to topological order and dependencies. When any vertex within a bubble fails, vertices within the bubble are restarted.

In one aspect, scheduler 601 schedules a bubble when sufficient resources are available to handle all supervertices of the bubble. Waiting until resources are available for all supervertices of a bubble before scheduling the bubble mitigates possible resource deadlock and resource starvation difficulties. When a vertex inside a bubble fails, computation can resume by rescheduling the execution of the failed bubble from the durable inputs for that bubble.

Figure 7:
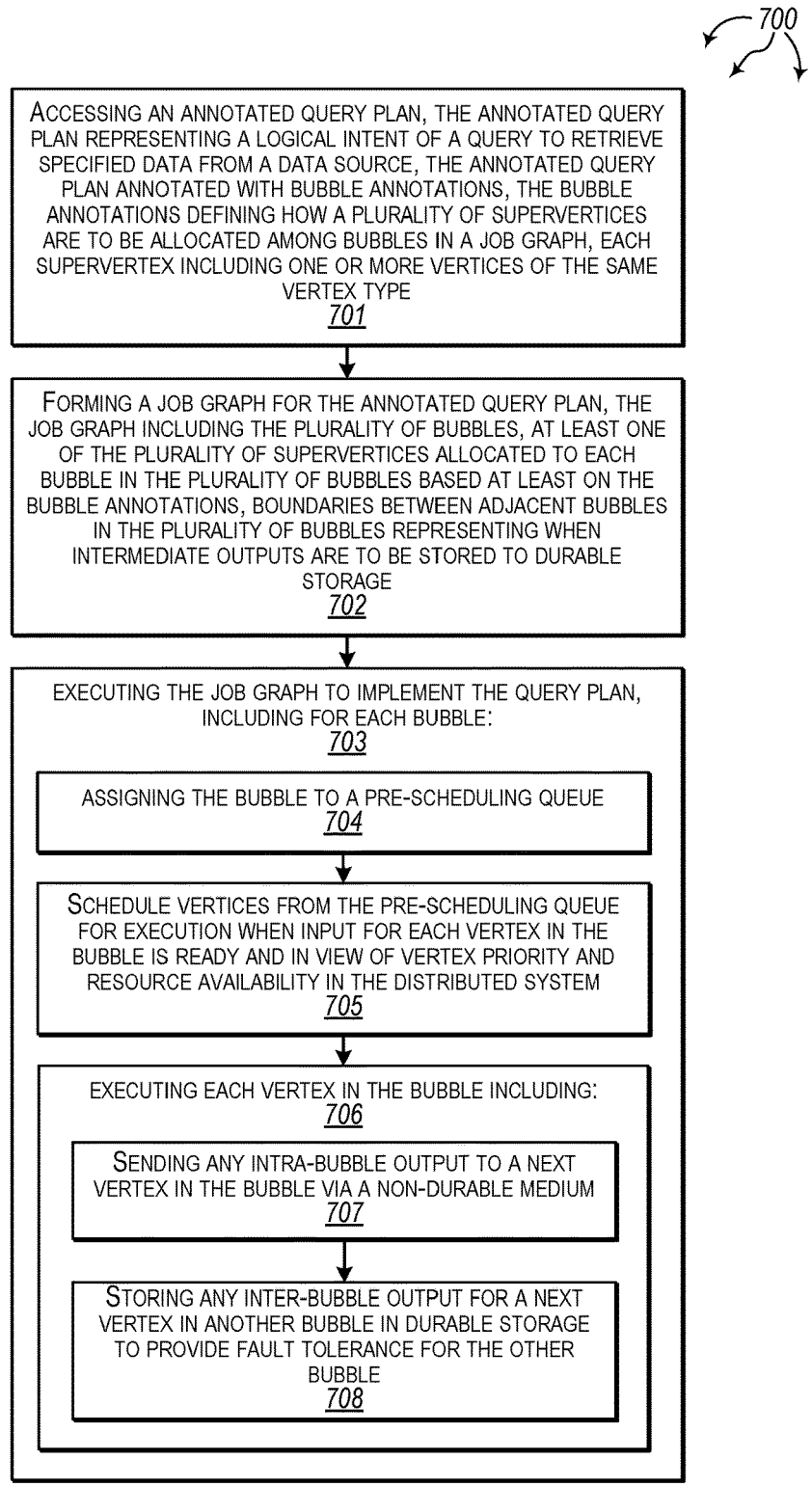
FIG. 7 illustrates an example a flow chart of an example method for executing an annotated query plan in a distributed system.

FIG. 7 illustrates an example a flow chart of an example method 700 for executing an annotated query plan in a distributed system. Method 700 will be described with respect to the components and data of computer architecture 600.

Method 700 includes accessing an annotated query plan, the annotated query plan representing a logical intent of a query to retrieve specified data from a data source, the annotated query plan annotated with bubble annotations, the bubble annotations defining how a plurality of supervertices are to be allocated among bubbles in a job graph, each supervertex including one or more vertices of the same vertex type (701). For example, scheduler 601 can access annotated plan 402. Annotated query plan can represent the logical intent of a query to retrieve specified data from data source 604. As described, annotated plan 402 is annotated with bubble annotations defining how supervertices 411-423 are to be allocated among bubble in a job graph.

Method 700 includes forming a job graph for the annotated query plan, the job graph including the plurality of bubbles, at least one of the plurality of supervertices allocated to each bubble in the plurality of bubbles based at least on the bubble annotations, boundaries between adjacent bubbles in the plurality of bubbles representing when intermediate outputs are to be stored to durable storage (702). For example, scheduler 601 can form job graph 602 (e.g., a Directed Acyclic Graph (DAG)). Job graph 602 can include a plurality of bubbles and bubble boundaries based on the bubble annotations in annotated plan 402.

Method 700 includes executing the job graph to implement the query plan (703). For example, scheduler 601 can execute job graph 602 to implement annotated query plan 402.

For each bubble, method 700 includes assigning the bubble to a pre-scheduling queue (704). For example, scheduler 601 can assign bubbles 431, 432, 433, 434, 436, 437, and 438 to queue 603.

For each bubble, method 700 includes scheduling vertices from the pre-scheduling queue for execution when input for each vertex in the bubble is ready and in view of vertex priority and resource availability in the distributed system (705). For example, scheduler 601 can schedule supervertices in bubbles 431, 432, 433, 434, 436, 437, and 438 for execution using the resources of distributed system 648.

Scheduler 601 can monitor resource availability 649 of distributed system 648 on an ongoing basis. Resources of distributed system 648 can be used to perform other processing tasks. As such, not all of the resources of distributed system 648 are available for executing annotated job graph 602. Further, available resources of distributed system 648 can fluctuate over time as other processing tasks use and release resources, machines go down, machines come online, etc.

In general, vertices within a bubble can be scheduled for execution when input for each of the vertices is ready and resource availability 649 indicates sufficient available resources to execute vertices. For example, the four vertices of supervertex 411 (bubble 431) can be scheduled when input for all four vertices is ready and resource availability 649 indicates sufficient available resources to execute all four vertices.

Within job graph 602 some supervertices can depend on intermediate results from other supervertices (and thus are not executed under the intermediate results are materialized to durable storage). For example, supervertices 412 and 413 in bubble 432 depend on intermediate results from the supervertex 411 in bubble 431. Thus, bubble 432 does not execute until intermediate results from bubble 431 are materialized to durable storage. Similarly, supervertices 414, 420, and 422 in bubble 433 depend on intermediate results from the supervertices 412 and 413 in bubbles 432, supervertices 416, 417, 418, and 419 in bubble 436, and the supervertex 421 in bubble 437. Thus, bubble 433 cannot execute until intermediate results from bubbles 432, 436, and 437 are materialized to durable storage.

Materializing intermediate results to durable storage provides fault tolerance. When one or more vertices inside a bubble fails, computation can resume at the bubble (i.e., job sub-graph) without having to restart job graph 602 in its entirety. Execution of the failed bubble can be rescheduled from stored intermediate results for vertices of the bubble.

Also within job graph 602 some supervertices can be executed in parallel. For example, the supervertices 411, 415, and 421 in bubbles 431, 434, and 437 respectively do not depend on one another. Thus, it is possible for some or all of bubbles 431, 434, and 437 to be executed in parallel when resource availability 649 indicates sufficient available resources. Similarly, the supervertices 412 and 413 in bubble 432 and supervertices 416, 417, 418, and 419 in bubble 436 do not depend on one another. Thus, it is possible for bubbles 432 and 436 to be executed in parallel.

However, even when bubbles can be executed in parallel, it may be more efficient to execute one or some bubbles prior to other bubbles. As such, scheduler 601 can assign a higher priority to bubbles for which earlier execution is desired. On the other hand, scheduler 601 can assign a lower priority to bubbles for which later execution is desired. For example, it may be more efficient to execute bubbles 431 and 434 prior to bubble 437, since bubble 433 also depends on bubbles 432 and 436 (and intermediate results from bubble 437 could remain in durable storage longer). As such, scheduler 601 can assign a higher priority to bubbles 431 and 434 and a lower priority of bubble 437.

For each bubble, method 700 includes executing each vertex in the bubble (706). When executing each vertex in the bubble, method 700 includes sending any intra-bubble output to a next vertex in the bubble via a non-durable medium (707). When executing each vertex in the bubble, method 700 includes storing inter-bubble output for a next vertex in another bubble in durable storage to provide fault tolerance for the other bubble (708).

For example, scheduler 601 can determine from resource availability 649 and assigned priorities that bubble 431 and bubble 434 can be executed in parallel using (e.g., processor and memory) resources of distributed system 648. Supervertex 411 can access initial inputs (e.g., from data source 604) and store intermediate results 633A, 633B, and 633C in durable storage 671 (corresponding to bubble boundary 441) to provide fault tolerance for bubble 432. After intermediate results 633A, 633B, and 633C are stored, resources used to execute bubble 431 can be reallocated for other purposes (e.g., to execute other bubbles). Supervertex 415 can access initial inputs (e.g., from data source 604) and store intermediate results 634A, 634B, and 634C in durable storage 672 (corresponding to bubble boundary 443) to provide fault tolerance for bubble 436. After intermediate results 634A, 634B, and 634C are stored, resources used to execute bubble 434 can be reallocated for other purposes (e.g., to execute other bubbles).

Scheduler 601 can then determine from resource availability 649 that there are sufficient resources to execute one of bubble 432 or bubble 437. Based on assigned priorities, scheduler 601 can execute bubble 432. Supervertex 412 can access intermediate results 633A, 633B, and 633C from durable storage 671. Supervertex 412 can stream (e.g., pipe) intermediate results 636A, 636B, and 636C to supervertex 413 via non-durable medium 637 (e.g., memory and/or network). In turn, supervertex 413 can store intermediate results 638A, 638B, 638C, and 638D in durable storage 673 (corresponding to bubble boundary 442) to provide fault tolerance for bubble 433. After intermediate results 638A, 638B, 638C, and 638D are stored, resources used to execute bubble 432 can be reallocated for other purposes (e.g., to execute other bubbles).

If any of the vertices in bubble 432 fail, scheduler 601 can reschedule execution of bubble 432 using intermediate results 633A, 633B, and 633C from durable storage 671. As such, bubble 432 can be re-executed without having to re-execute bubble 431.

Scheduler 601 can then determine from resource availability 649 that there are sufficient resources to execute one of bubble 436 or bubble 437. Based on assigned priorities, scheduler 601 can execute bubble 436. Supervertex 416 can access intermediate results 634A, 634B, and 634C from durable storage 672. Supervertex 416 can stream other intermediate results to supervertex 419 via non-durable medium 639. Supervertex 417 can access initial inputs (e.g., from data source 604) and stream additional intermediate results to supervertex 418 via non-durable medium 638. In turn, supervertex 418 can stream further intermediate results to supervertex 419 via non-durable medium 639. Supervertex 419 can store intermediate results 639A, 639B, 639C, and 639D in durable storage 674 (corresponding to bubble boundary 444) to provide fault tolerance for bubble 433. After intermediate results 639A, 639B, 639C, and 639D are stored, resources used to execute bubble 436 can be reallocated for other purposes (e.g., to execute other bubbles).

If any of the vertices in bubble 436 fail, scheduler 601 can reschedule execution of bubble 436 using intermediate results 634A, 634B, and 634C from durable storage 672. As such, bubble 436 can be re-executed without having to re-execute bubble 434.

Bubble 437 can then be executed. Supervertex 421 can access initial inputs (e.g., from data source 604) and store intermediate results 641 to durable storage 476 (corresponding to bubble boundary 446) to provide fault tolerance for bubble 433. After intermediate results 641 are stored, resources used to execute bubble 437 can be reallocated for other purposes (e.g., to execute other bubbles).

Bubble 433 can then be executed. Supervertex 414 can access intermediate results 638A, 638B, 638C, and 638D from durable storage 673. Similarly, supervertex 420 can 639A, 639B, 639C, and 639D from durable storage 674. Supervertices 414 and 420 can stream other intermediate results to supervertex 422 via non-durable medium 681. Supervertex 422 can also access intermediate results 641 from durable storage 676. Supervertex 422 can store intermediate results 642 to durable storage 677 (corresponding to bubble boundary 447) to provide fault tolerance for bubble 438. After intermediate results 642 are stored, resources used to execute bubble 433 can be reallocated for other purposes (e.g., to execute other bubbles).

If any of the vertices in bubble 433 fail, scheduler 601 can reschedule execution of bubble 433 using intermediate results 638A, 638B, 638C, and 638D from durable storage 673, using intermediate results 639A, 639B, 639C, and 639D from durable storage 674, and using intermediate results 641 from durable storage 676. As such, bubble 437 can be re-executed without having to re-execute any of bubbles 431, 432, 434, 436, or 437.

Bubble 438 can then be executed. Supervertex 423 can access intermediate results 642 from durable storage 677. Supervertex 423 can formulate a final result for job graph 602 from intermediate results 642. After the final result is formulated, resources used to execute bubble 438 can be reallocated for other purposes (e.g., to execute other bubbles).

If any of the vertices in bubble 438 fail, scheduler 601 can reschedule bubble 438 using intermediate results 642 from durable storage 677. As such, bubble 438 can be re-executed to formulate a final result without having to re-execute any of bubbles 431, 432, 433, 434, 436, or 437.

In some aspects, scheduler 601 uses a dependency chain when determining an order for executing bubbles. For example, FIG. 8 illustrates an example dependency chain 800 for job graph 620. Scheduler 601 can refer to dependency chain 800 to determine when to execute bubbles. As depicted, bubble 438 is dependent on bubble 433. Bubble 433 is dependent on bubbles 432, 436, and 437. Bubble 436 is dependent on bubble 434. Bubble 432 is dependent on bubble 431.

Scheduler 601 can also use a static priority when determining an order for executing bubbles. In one aspect, bubbles with higher priority numbers are scheduled earlier. A priority start can be calculated from the output bubble (bottom), which has the smallest priority. FIG. 9 illustrates an example equation 900 for calculating bubble priority. Using equation 900, priorities for bubbles of job graph 602 can be calculated.

FIG. 10 illustrates an example of bubble priorities for the bubbles of job graph 602. Bubble 438 (the output bubble) has priority 1001 (value of 100). Bubbles 433 and 437 have priority 1002 (value of 200). Bubbles 432 and 436 have priority 1003 (value 300). Bubbles 431 and 434 have priority 1004 (value of 400).

When multiple bubbles have inputs ready (i.e., dependencies are satisfied) but (e.g., scale-out) distributed system resources are available to execute only some of the multiple bubbles, scheduler 601 can schedule one or more bubbles with higher priority for execution. Scheduler 601 can schedule bubbles with lower priority later when other distributed system resources become available. For example, scheduler 601 can schedule bubble 431 or 434 for execution prior to scheduling bubble 437 for execution.

When multiple bubbles have the same priority, job scheduler 601 can select a combination of one or more bubbles for execution that best matches and/or utilizes available distributed system resources.

In one aspect, when resources become available, job scheduler 601 considers bubbles for which inputs are ready. For bubbles for which inputs are ready, job scheduler 601 considers any bubbles for which the available resources are sufficient to execute the bubble. Depending on available resources and resource consumption of bubbles, job scheduler 601 can determine that a plurality of bubbles can be executed in parallel. If more bubbles are available for execution than the available resources can support, job scheduler 601 can refer to bubble priorities to select a sub-set of the plurality of bubbles for execution.

Accordingly, aspects of the invention include scheduling a bubble as a "gang" of supervertices. However, a scheduler is not required to acquire resources for all bubbles at once. Instead a scheduler can schedule one or more bubbles depending on resource availabilities. Scheduling bubbles as resources are available, reduces vertical parallelism and hard resource constraints of gang scheduling.

Bubbles provide a natural failure boundary for a job graph and re-executing a bubble along with storage of intermediate results in durable storage can be used to recover from failures. Durable storage provides a light-weight failover in case of non-deterministic behavior. However, jobs can also leverage streaming to increase performance.

Accordingly, aspects provide an approach to divide the execution of a job graph into sub-graphs (bubbles) in a way that: (a) intra-bubble communication of result sets can be streamed (pipelined) using in-memory or network communication (for performance); (b) inter-bubble results are stored in durable storage to enable fault-tolerance; and (c) it is possible to schedule the execution of relatively larger job graphs by dividing and conquering the execution of the sub-graphs (bubbles) using available compute resources (this optimizes the use of compute resources in a distributed environment). The approach enables fault-tolerant execution. If a vertex inside a bubble fails, a scheduler can schedule the re-execution of the failed bubble from the durable inputs for that bubble. The approach optimizes resources and work already completed by avoiding the re-execution of the entire job graph. Determining bubble boundaries can be a cost-based optimized decision.

In some aspects, a computer system comprises one or more hardware processors and system memory. The one or more hardware processors are configured to execute instructions stored in the system memory to stream results with fault tolerance in a distributed system.

The one or more hardware processors execute instructions stored in the system memory to access a job graph. The job graph indicates a plurality of bubbles, each bubble including one or more supervertices. Each supervertex includes one or more vertices of the same vertex type. The job graph is divided into bubbles based on determined resource consumption each of the plurality of supervertices and dependencies between supervertices within the plurality of supervertices.

The one or more hardware processors execute instructions stored in the system memory to execute the job graph using resources of the distributed system. Execution of the job graph includes for a bubble in the plurality of bubbles, streaming results from one supervertex within the bubble to another supervertex within the bubble via one of: memory or a network connection. Execution of the job graph includes for another bubble in the plurality of bubbles, storing other results from a supervertex within the other bubble to durable storage. Execution of the job graph includes for a further bubble in the plurality of bubbles, accessing the other results from the durable storage.

Computer implemented methods for streaming results with fault tolerance in a distributed system are also contemplated. Computer program products for storing the instructions, that when executed by a processor, cause a computer system to stream results with fault tolerance in a distributed system are also contemplated.

In other aspects, a computer system comprises one or more hardware processors and system memory. The one or more hardware processors are configured to execute instructions stored in the system memory to optimize a query for execution in a scale-out distributed system.

The one or more hardware processors execute instructions stored in the system memory to access a query plan. The query plan implements the logical intent of a query within a scale-out distributed system. The query plan includes a plurality of supervertices. Each supervertex includes one or more vertices of the same vertex type. The one or more hardware processors execute instructions stored in the system memory to determine resource consumption and dependencies for each of the plurality of supervertices.

The one or more hardware processors execute instructions stored in the system memory to, based at least on the determined resource consumption and dependencies for each of the plurality of supervertices, assign the plurality of supervertices into a plurality of bubbles. Each of the plurality of bubbles being assigned one or more of the plurality of supervertices The one or more hardware processors execute instructions stored in the system memory to annotate the query plan with bubble annotations and bubble boundary annotations. The bubble annotations identify supervertices, from among the plurality of vertices, that are to be scheduled as a group for execution within the scale-out distributed system. Bubble boundary annotations identify when intermediate outputs are to be stored to durable storage within the scale-out distributed system.

Computer implemented methods for optimizing a query for execution in a scale-out distributed system are also contemplated. Computer program products for storing the instructions, that when executed by a processor, cause a computer system to optimize a query for execution in a scale-out distributed system are also contemplated.

In other aspects, a computer system comprises one or more hardware processors and system memory. The one or more hardware processors are configured to execute instructions stored in the system memory to implement a query plan execution in a distributed system.

The one or more hardware processors execute instructions stored in the system memory to access an annotated query plan. The annotated query plan represents a logical intent of a query to retrieve specified data from a data source. The annotated query plan is annotated with bubble annotations. The bubble annotations defining how a plurality of supervertices are to be allocated among bubbles in a job graph, each supervertex including one or more vertices of the same vertex type.

The one or more hardware processors execute instructions stored in the system memory to form a job graph for the annotated query plan. The job graph includes the plurality of bubbles. At least one of the plurality of supervertices is allocated to each bubble in the plurality of bubbles based at least on the bubble annotations. Boundaries between adjacent bubbles in the plurality of bubbles represent when intermediate outputs are to be stored to durable storage.

The one or more hardware processors execute instructions stored in the system memory to execute the job graph to implement the query plan. For each bubble, the bubble is assigned the bubble to a pre-scheduling queue. For each bubble, vertices from the pre-scheduling queue are scheduler for execution when input for each vertex in the bubble is ready and in view of vertex priority and resource availability in the distributed system. For each bubble, each vertex in the bubble is executed.

During execution for each vertex, any intra-bubble output is sent to a next vertex in the bubble via a non-durable medium. During execution for each vertex, any inter-bubble output for a next vertex in another bubble is stored in durable storage to provide fault tolerance for the next bubble.

Computer implemented methods for implementing a query plan execution in a distributed system are also contemplated. Computer program products for storing the instructions, that when executed by a processor, cause a computer system to implement a query plan execution in a distributed system are also contemplated.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system comprising:
one or more hardware processors;
system memory coupled to the one or more hardware processors, the system memory storing instructions that are executable by the one or more hardware processors;
the one or more hardware processors configured to execute the instructions stored in the system memory to pipeline result sets with fault tolerance in distributed query execution, including the following:
access a job graph, the job graph indicating a plurality of bubbles, each bubble including one or more supervertices from a plurality of supervertices, each supervertex including one or more vertices of a same vertex type, the job graph divided into the plurality of bubbles based on determined resource consumption for each of the plurality of supervertices and dependencies between supervertices within the plurality of supervertices; and
execute the job graph using resources of a distributed system including:

for a bubble in the plurality of bubbles, streaming results from one supervertex within the bubble to another supervertex within the bubble via one of: memory or a network connection;

for another bubble in the plurality of bubbles, storing other results from a supervertex within the another bubble to durable storage; and for a further bubble in the plurality of bubbles, accessing the other results from the durable storage.

2. The computer system of claim 1, wherein the one or more hardware processors configured to execute the instructions stored in the system memory to access a job graph comprise the one or more hardware processors configured to execute the instructions stored in the system memory to access a job graph for implementing logical intent of a query.

3. The computer system of claim 1, wherein the one or more hardware processors configured to execute the instructions stored in the system memory to access a job graph comprise the one or more hardware processors configured to execute the instructions stored in the system memory to access a Directed Acyclic Graph.

4. The computer system of claim 1, wherein the one or more hardware processors configured to execute the instructions stored in the system memory to execute the job graph using resources of the distributed system comprise the one or more hardware processors configured to execute the instructions stored in the system memory to execute the job graph using memory and processor resources of the distributed system.

5. The computer system of claim 1, wherein the one or more hardware processors configured to execute the instructions stored in the system memory to execute the job graph using resources of the distributed system comprise the one or more hardware processors configured to execute the instructions stored in the system memory to execute the job graph using resources of a scale-out distributed system.

6. The computer system of claim 1, wherein the one or more hardware processors configured to execute the instructions stored in the system memory to execute the job graph using resources of the distributed system comprise the one or more hardware processors configured to execute the instructions stored in the system memory to:

monitor the availability of distributed system resources on an ongoing basis; and execute bubbles, from among the plurality of bubbles, in an optimal cost-based optimized manner, as distributed system resources are available to handle the bubbles.

7. The computer system of claim 1, wherein the bubble and the another bubble are the same bubble.

8. The computer system of claim 1, wherein the one or more hardware processors configured to execute the instructions stored in the system memory to execute the job graph using resources of the distributed system comprise the one or more hardware processors configured to execute the instructions stored in the system memory to execute each bubble in plurality of bubbles as input for the bubble is available.

9. The computer system of claim 1, wherein the one or more hardware processors configured to execute the instructions stored in the system memory to execute the job graph using resources of the distributed system comprise the one or more hardware processors configured to execute the instructions stored in the system memory to execute at least one bubble prior to at least one other bubble based bubble priority.

10. A computer system comprising:

one or more hardware processors;

system memory coupled to the one or more hardware processors, the system memory storing instructions that are executable by the one or more hardware processors; and the one or more hardware processors configured to execute the instructions stored in the system memory to optimize a query for execution in a scale-out distributed system, including the following:

access a query plan, the query plan to implement logical intent of the query within the scale-out distributed system, the query plan including a plurality of supervertices, each supervertex including one or more vertices of a same vertex type;

determine resource consumption and dependencies for each of the plurality of supervertices;

based at least on the determined resource consumption and dependencies for each of the plurality of supervertices, assign the plurality of supervertices into a plurality of bubbles, each of the plurality of bubbles assigned one or more of the plurality of supervertices; and annotate the query plan with bubble annotations and bubble boundary annotations, the bubble annotations identifying supervertices, from among the plurality of supervertices, that are to be scheduled as a group for execution within the scale-out distributed system, bubble boundary annotations identifying when intermediate outputs are to be stored to durable storage within the scale-out distributed system.

11. The computer system of claim 10, wherein the one or more hardware processors configured to execute the instructions stored in the system memory to access a query plan comprise the one or more hardware processors configured to execute the instructions stored in the system memory to access an Abstract Syntax Tree.

12. The computer system of claim 10, wherein the one or more hardware processors configured to execute the instructions stored in the system memory to assign the plurality of supervertices into a plurality of bubbles comprise the one or more hardware processors configured to execute the instructions stored in the system memory to assign a sub-plurality of supervertices, from among the plurality of supervertices, to at least one of the plurality of bubbles.

13. The computer system of claim 10, wherein the one or more hardware processors configured to execute the instructions stored in the system memory to assign the plurality of supervertices into a plurality of bubbles comprise the one or more hardware processors configured to execute the instructions stored in the system memory to assign the plurality of supervertices into a plurality of bubbles in a cost-based optimized manner based on a parallelism metric and an intermediate data size metric.

14. A computer system comprising:

one or more hardware processors;

system memory coupled to the one or more hardware processors, the system memory storing instructions that are executable by the one or more hardware processors; and the one or more hardware processors configured to execute the instructions stored in the system memory to implement query plan execution in a distributed system, including the following:

access an annotated query plan, the annotated query plan representing a logical intent of a query to retrieve specified data from a data source, the annotated query plan annotated with bubble annotations and bubble boundary annotations, the bubble annotations defining how a plurality of supervertices are to be allocated among a plurality of bubbles in a job graph, each supervertex including one or more vertices of a same vertex type, the bubble boundary annotations defining boundaries between the plurality of bubbles;

form the job graph for the annotated query plan, the job graph including the plurality of bubbles, at least one of the plurality of supervertices allocated to each bubble in the plurality of bubbles based at least on the bubble annotations, boundaries between adjacent bubbles in the plurality of bubbles representing when intermediate results are to be stored to durable storage; and execute the job graph to implement the annotated query plan, including for each bubble of the plurality of bubbles:

execute each vertex in the bubble including:

send any intra-bubble output to a next vertex in the bubble via a non-durable medium; and store any inter-bubble output for a subsequent vertex in another bubble in durable storage to provide fault tolerance for the another bubble.

15. The computer system of claim 14, wherein the one or more hardware processors configured to execute the instructions stored in the system memory to execute the job graph to implement the annotated query plan comprise the one or more hardware processors configured to execute the instructions stored in the system memory to, for each bubble:

assign the bubble to a pre-scheduling queue; and schedule the bubble from the pre-scheduling queue for execution when input for each vertex in the bubble is ready and in view of vertex priority and resource availability in the distributed system.

16. The computer system of claim 15, wherein the one or more hardware processors configured to execute the instructions stored in the system memory to schedule the bubble from the pre-scheduling queue for execution comprise the one or more hardware processors configured to execute the instructions stored in the system memory to schedule the bubble for execution based on the bubble having a higher priority than at least one other bubble.

17. The computer system of claim 15, wherein the one or more hardware processors configured to execute the instructions stored in the system memory to schedule the bubble from the pre-scheduling queue for execution comprise the one or more hardware processors configured to execute the instructions stored in the system memory to schedule the bubble for execution based on the input from the bubble being stored in durable storage.

18. The computer system of claim 15, wherein the one or more hardware processors configured to execute the instructions stored in the system memory to schedule the bubble from the pre-scheduling queue for execution comprise the one or more hardware processors configured to execute the instructions stored in the system memory to schedule the bubble for execution in parallel with at least one other bubble in view of the resource availability in the distributed system.

19. The computer system of claim 14, wherein the one or more hardware processors configured to execute the instructions stored in the system memory to send any intra-bubble output to a next vertex in the bubble via the non-durable medium comprise the one or more hardware processors configured to execute the instructions stored in the system memory to send any intra-bubble output to the next vertex in the bubble via network communication.

20. The computer system of claim 14, wherein each vertex implements one or more of the following: extracting data, transforming data, filtering data, joining data, sorting data, aggregating data, merging data, grouping data, accessing data, or storing data.

* * * * *